United States Patent [19]

Tooley et al.

[11] Patent Number: 4,940,686

[45] Date of Patent: Jul. 10, 1990

[54] CATALYST FOR OXIDATION OF CARBON MONOXIDE

[75] Inventors: Patricia A. Tooley, Bartlesville; John H. Kolts, Ochelata, both of Okla.

[73] Assignee: Phillips Petroleum Company, Bartlesville, Okla.

[21] Appl. No.: 406,385

[22] Filed: Aug. 7, 1989

[51] Int. Cl.$^5$ .................. B01J 21/04; B01J 23/64; B01J 23/89

[52] U.S. Cl. .................................. 502/327; 502/326

[58] Field of Search ................... 502/326, 327, 353

[56] References Cited

U.S. PATENT DOCUMENTS

| | | | |
|---|---|---|---|
| 3,830,757 | 8/1974 | Evnin et al. | 252/464 |
| 3,865,923 | 2/1975 | Stephens | 423/213.2 |
| 4,117,082 | 9/1978 | Matsuyama | 423/247 |
| 4,171,347 | 10/1978 | Hass | 423/539 |
| 4,246,141 | 1/1981 | Hass et al. | 252/455 Z |
| 4,492,770 | 1/1985 | Blanchard et al. | 502/326 X |
| 4,621,071 | 11/1986 | Blanchard et al. | 502/302 |
| 4,623,637 | 11/1986 | van der Smissen | 502/333 |
| 4,639,432 | 1/1987 | Holt et al. | 502/324 |
| 4,818,745 | 4/1989 | Kolts | 502/327 |

FOREIGN PATENT DOCUMENTS

| | | | |
|---|---|---|---|
| 61-120640 | 6/1986 | Japan | 502/326 |
| 1116585 | 6/1968 | United Kingdom . | |

*Primary Examiner*—W. J. Shine
*Attorney, Agent, or Firm*—K. K. Brandes

[57] ABSTRACT

A composition comprises (a) at least one vanadium oxide as support material, (b) platinum metal, and (c) iron oxide and/or metal. This composition is used as catalyst in the reaction of carbon monoxide and oxygen to carbon dioxide. Preferably, the composition is made by a preparation process comprising the steps of impregnating the support material with an aqueous acid solution (preferably concentrated nitric acid) of Pt and Fe compounds.

14 Claims, No Drawings

CATALYST FOR OXIDATION OF CARBON MONOXIDE

BACKGROUND OF THE INVENTION

In one aspect, this invention relates to an effective CO oxidation catalyst composition. In another aspect, this invention relates to a process for preparing a CO oxidation catalyst composition. In a further aspect, this invention relates to the catalytic oxidation of carbon monoxide to carbon dioxide.

The use of catalysts for the oxidation of carbon monoxide to carbon dioxide by reaction with oxygen, in particular at low temperature, is of much interest, e.g., in breathing masks designed to remove CO from inhaled air, in smoking articles (e.g., cigarettes) so as to remove CO from smoke or aerosols, and in $CO_2$ lasers for combining CO and $O_2$ formed by dissociation of $CO_2$ during discharge. In the latter application, the presence of $O_2$ is most undesirable because it can cause a breakdown of the electrical field in the laser cavity. Even though compositions useful as CO oxidation catalysts in $CO_2$ laser applications are known, there is an ever present need to develop new, effective CO oxidation catalyst compositions and/or improved processes for preparing effective CO oxidation catalyst compositions.

SUMMARY OF THE INVENTION

It is an object of this invention to provide a composition of matter which is effective as a catalyst for the oxidation of carbon monoxide with free oxygen. It is another object to provide a process for preparing a composition of matter which is effective as a catalyst for the oxidation of carbon monoxide. It is a further object of this invention to provide an effective process for catalytically oxidizing carbon monoxide. Other objects and advantages will be apparent from the detailed description and the claims.

In accordance with this invention, there is provided a composition of matter (effective as a catalyst for oxidizing carbon monoxide with free oxygen to carbon dioxide, in particular at about 20°-30° C.) comprising (preferably consisting essentially of) (a) platinum metal, (b) an iron component selected from the group consisting of iron oxides, iron metal and mixtures thereof (preferably consisting essentially of at least one iron oxide), and (c) at least one vanadium oxide as support material. The preferred support material is $V_2O_5$. In another embodiment, the support material (c) further comprises alumina as carrier for vanadium oxide.

Also in accordance with this invention, there is provided a process for preparing the composition comprising (consisting essentially of) components (a), (b), and (c), as defined above, comprising the steps of impregnating support material (c) with a solution (preferably acidic) of platinum and iron compounds, drying/calcining the impregnated material, and reducing the calcined material.

Further in accordance with this invention, a process for at least partially converting CO and $O_2$ to $CO_2$ (preferably at a temperature below 100° C.) employs a catalyst composition comprising (consisting essentially of) components (a), (b) and (c), as defined above.

DETAILED DESCRIPTION OF THE INVENTION

Any oxide of vanadium can be used as support material (c) in the composition of matter of this invention). Non-limiting examples of such vanadium oxides are: $V_2O_5$, $VO_2$, $V_2O_3$, $VO$, and mixtures thereof. Presently preferred is $V_2O_5$.

It is within the scope of this invention to prepare suitable support materials by coating a porous ceramic material, such as a monolith (commercially available from Corning Glass Works, Corning, NY), with oxide(s) of vanadium. Other suitable porous ceramic support materials are glass frits, sintered alumina and the like (such as those disclosed in U.S. Pat. No. 3,963,827). The choice of the ceramic material is determined by cost, pore structure, surface area, attrition resistance and similar factors. The porous ceramic material (preferably a monolith) can be impregnated with at least one dissolved compound of vanadium (such as vanadic acid or ammonium vanadate), dried and calcined (so as to decompose the aboved-used compound(s) of V). Or the porous ceramic material (preferably monolith) can be impregnated with a dispersion of V oxide particles, followed by drying and calcining.

It is further within the scope of this invention to use a support material comprising porous alumina particles (preferably having $BET/N_2$ surface area of about 10–500 $m^2/g$) as base support (carrier) and an oxide of vanadium (more preferably $V_2O_5$) deposited thereon by any conventional means, such as those described above for coating ceramic materials. Generally, the weight ratio of alumina to said oxide of vanadium is about 30:1 to about 1:1 (preferably about 20:1 to about 4:1).

The impregnation of the support material (c) with Pt and Fe compounds can be carried out in any suitable manner. Preferably, compounds of Pt and Fe are dissolved in a suitable solvent (e.g., water or, preferably, a concentrated aqueous solution of an acid such as $HNO_3$) so as to prepare solutions of suitable concentration, generally containing from about 0.005 to about 0.40 g Pt per cc solution, preferably about 0.01 to about 0.1 g Pt per cc solution, and about 0.005 to about 0.4 g Fe per cc solution, preferably about 0.01 to about 0.1 g Fe per cc solution. When an aqueous nitric acid solution is used as solvent for the Pt and Fe compounds, the concentration of $HNO_3$ in the solvent is generally about 20–65 weight-% $HNO_3$. Non-limiting examples of suitable compounds of Pt and of Fe are: $Pt(NH_3)_2(NO_2)_2$, $Pt(NH_3)_4(NO_3)_2$ and the like; $Fe(NO_3)_2$, $Fe(NO_3)_3$, $FeSO_4$, $FeNH_4(SO_4)_2$, Fe carboxylates, Fe acetylacetonates and the like; preferably (at present) $Pt(NH_3)_2(NO_2)_2$ and Fe(III) acetylacetonate.

The support material is generally impregnated by soaking it in the solution of Pt and Fe compounds; or (less preferably) the Pt and Fe containing solution is sprayed onto the support material. The ratio of the Pt and Fe containing solution to the support material generally is such that the final composition of matter contains about 0.2 to about 10 weight-% Pt (preferably about 0.5 to about 5 weight-% Pt), and about 0.1 to about 20 weight-% Fe (preferably about 0.5 to about 5 weight-% Fe). Broadly, components (a) and (b) are present in the composition of matter of this invention at such levels and ratios that component (b) is effective as a copromoter for component (a) on support (c) in the catalytic reaction of CO and $O_2$ to $CO_2$, in particular at a temperature of about 10°-50° C.

It is within the scope of this invention (yet less preferred) to impregnate the support material (c) sequentially with compounds of Pt and Fe using solutions of these compounds. When sequential impregnation is employed, the impregnation can be done in any order (first Pt, then Fe, or vice versa). The concentrations of Pt and Fe in the separate solutions are essentially the same as the above-recited concentrations of Pt and Fe.

A heating step, after the impregnating step(s), is generally carried out in an inert or oxidizing atmosphere, preferably a free oxygen containing gas atmosphere (such as air), generally at a temperature ranging from about 50° to about 700° C. Preferably, the heating step is carried out in two sequential sub-steps: first, at about 50° to about 200° C. (preferably at 80°–130° C.), generally for about 0.5 to about 10 hours, so as to substantially dry the Pt/Fe-impregnated material (preferably under such conditions as to reduce the level of adhered and occluded water to less than about 10 weight-%); and thereafter, at about 300° to about 700° C. (preferably about 400° to about 600° C.), generally for about 1 to about 20 hours, so as to calcine the substantially dried material under such conditions as to substantially convert the compounds of Pt and Fe used in the impregnation step to oxides of Pt and Fe.

Thereafter, a reducing step is carried out within the above dried, calcined material in any suitable manner at a temperature in the range of from about 20° to about 600° C., preferably from about 150° to about 350° C. Any reducing gas can be employed in the reducing step, such as a gas comprising $H_2$, CO, gaseous hydrocarbons (e.g. methane), mixtures of the above, and the like. Preferably, a free hydrogen containing gas, more preferably substantially pure $H_2$, is employed. The reducing step can be carried out for any period of time effective for activating the calcined material obtained in the previous step (i.e., making the reduced material more active as catalyst for CO oxidation than the calcined material), preferably from about 0.5 to about 20 hours. Pt exists substantially as Pt metal after the reducing step, however, insignificant amounts of oxides of Pt may also be present. It is believed that the iron component is substantially present as iron oxide (FeO and/or $Fe_3O_4$ and/or $Fe_2O_3$), with small amounts of iron metal possibly being present, too (especially when a relatively high reducing temperature is employed).

The process of oxidizing a carbon monoxide containing feed gas can be carried out at any suitable temperature and pressure conditions, for any suitable length of time, at any suitable gas hourly space velocity, and any suitable volume ratio of CO and $O_2$. The reaction temperature generally is in the range of from about −50° to about 400° C., preferably from about −30° to about 170° C., more preferably from about 10° to about 50° C., most preferably at about 20°–30° C. The pressure during the oxidation process generally is in the range of from about 1 to about 2,000 psia, more preferably from about 5 to about 20 psia. The volume ratio of CO to $O_2$ in the feed gas can range from about 1:100 to about 100:1, and preferably is in the range of about 1:10 to about 10:1. The volume percentage of CO and the volume percentage of $O_2$ in the feed gas can be each in the range of from about 0.05 to about 50, preferably from about 0.5 to about 3. The gas hourly space velocity (cc feed gas per cc catalyst per hour) can be in the range of from about 1 to about 200,000, preferably from about 100 to about 50,000. It is understood that the calculation of the gas hourly space velocity is based on the volume of the active catalyst, i.e., the supported catalyst comprising platinum and iron promoters, excluding the volume occupied by any ceramic support material, such as a monolith material.

The feed gas can be formed in any suitable manner, e.g., by mixing CO, $O_2$ and optionally other gases such as $CO_2$, $N_2$, He and the like, such as in a carbon dioxide laser cavity. Or the feed gas can be an exhaust gas from a combustion engine, or it can be CO-contaminated air that is to be inhaled by humans, and the like. The feed gas can be contacted in any suitable vessel or apparatus, such as in a laser cavity or in an exhaust pipe of a combustion engine, or in a gas mask used by humans, wherein the feed gas passes over the catalyst composition of this invention at the conditions described above. The CO oxidation process for this invention can be carried out in any suitable setting and for any purpose, e.g., for recombining CO and $O_2$ in $CO_2$ lasers, to oxidize CO contained in tobacco smoke, exhaust gases or air, and the like.

The following examples are presented in further illustration of the invention and are not to be construed as unduly limiting the scope of the invention.

EXAMPLE I

This example illustrates the experimental setup for testing the activity of various noble metal catalysts for catalyzing the oxidation of carbon monoxide (so as to simulate the catalytic recombination of CO and $O_2$ in $CO_2$ lasers). A gaseous feed blend comprising 1.2 volume-% CO, 0.6 volume-% $O_2$, 32 volume-% $CO_2$, 32 volume-% He and about 34 volume-% $N_2$ was passed through a needle valve and a glass reactor in an upflow direction. The glass reactor tube had an inner diameter of about 6 mm and generally contained 1–2 grams catalyst in a bed of about 2–3 cm height. The temperature in the catalyst bed was measured by means of a thermocouple inserted into the top layer of the catalyst bed. The CO content in the reactor effluent was determined by means of a Series 400 Anarad IR analyzer.

All tests were carried out at about 23° C. Generally, the temperature in the catalyst bed rose several degrees during a test run because of the generation of heat during the CO oxidation reaction. The feed rate of the gaseous feed stream generally was in the range of about 200 cc/minute.

EXAMPLE II

This example illustrates the preparation of catalyst compositions of this invention and their performance in CO oxidation tests.

Catalyst A was prepared by mixing 5 g $V_2O_5$, which had been calcined in air at 300° C., with a mixture of 0.31 g iron(III) acetylacetonate (provided by Aldrich Chemical Company, Milwaukee, WI), 0.31 g $Pt(NH_3)_2(NO_2)_2$ (provided by Strem Chemicals, Inc., Newburyport, MA) and 4 cc concentrated nitric acid. The thus-impregnated $V_2O_5$ was dried at 65° C., calcined in air at 300° C. for 2 hours, and treated (just before testing) with hydrogen gas at 200° C. for 2 hours. Catalyst A contained 3.5 weight-% Pt and 0.9 weight-% Fe.

Catalyst B contained 2.8 weight-% Pt and 0.6 weight-% Fe on $V_2O_5$, and was prepared by a somewhat different procedure. 5 grams of $V_2O_5$ were mixed with 7 grams of an aqueous solution of $Pt(NH_3)_4(NO_3)_2$, which contained 0.02 g Pt per g solution, and an aqueous solution of 0.21 g $Fe(NO_3)_2.9H_2O$. The thus-impregnated material was dried, calcined and heated in $H_2$, as described for Catalyst A.

Catalyst C was prepared in accordance with procedure for Catalyst B, except that $V_2O_5$ had been treated with concentrated $HNO_3$, dried and calcined in air at 300° C. for 2 hours, before the impregnation with the Pt and Fe compounds was carried out.

Catalyst D was prepared essentially in accordance with the procedure for Catalyst A, except that less of the iron and platinum compounds were applied in the impregnation step. Catalyst D contained 1.4 weight-% Pt and 0.4 weight-% Fe on $V_2O_5$.

Catalyst E was prepared substantially in accordance with the procedure for Catalyst A, except that a material comprising 10 weight-% $V_2O_5$ on alumina (provided by Strem Chemicals, Inc., Newburyport, MA) was used in lieu of 100% $V_2O_5$. Catalyst E contained 2.8 weight-% Pt and 0.9 weight-% Fe on a support material comprising 10 weight-% $V_2O_5$ and about 90 weight-% $Al_2O_3$.

Catalyst F (control) contained 2.7 weight-% Pt and 0.9 weight-% Fe on $Ta_2O_5$ as support material. Catalyst F was prepared substantially in accordance with the procedure described for Catalyst A, except that $Ta_2O_5$ was used in lieu of $V_2O_5$.

EXAMPLE III

This example illustrates the performance of the catalysts of Example II in CO oxidation tests, carried out in accordance with the procedure of Example I. Two grams of Catalyst E were employed, whereas the amount of Catalysts A-D and F was 1 gram. Test results are summarized in Table I.

TABLE I

| Catalyst | Hours on Stream | % CO Conversion | cc CO per Minute per Gram Catalyst Converted |
|---|---|---|---|
| A | 1 | 69.4 | 1.72 |
|   | 2 | 61.7 | 1.53 |
|   | 3 | 58.9 | 1.46 |
|   | 4 | 56.5 | 1.40 |
|   | 6 | 53.6 | 1.33 |
|   | 8 | 50.8 | 1.26 |
|   | 10 | 48.8 | 1.21 |
|   | 12 | 47.2 | 1.17 |
|   | 14 | 44.8 | 1.11 |
|   | 16 | 42.7 | 1.06 |
|   | 18 | 41.1 | 1.02 |
|   | 20 | 39.1 | 0.97 |
| B | 1 | 30.0 | 0.72 |
|   | 2 | 27.9 | 0.67 |
|   | 3 | 27.1 | 0.65 |
|   | 4 | 26.7 | 0.64 |
|   | 6 | 25.8 | 0.62 |
|   | 8 | 24.6 | 0.59 |
|   | 10 | 23.7 | 0.57 |
|   | 12 | 22.9 | 0.55 |
|   | 14 | 22.1 | 0.53 |
|   | 16 | 21.7 | 0.52 |
|   | 18 | 20.8 | 0.50 |
| C | 1 | 31.7 | 0.76 |
|   | 2 | 30.0 | 0.72 |
|   | 3 | 29.2 | 0.70 |
|   | 4 | 28.8 | 0.69 |
| D | 1 | 30.0 | 0.72 |
|   | 2 | 21.7 | 0.52 |
| E | 1 | 94.2 | 1.13 |
|   | 2 | 93.8 | 1.13 |
|   | 3 | 92.5 | 1.11 |
|   | 4 | 91.7 | 1.10 |
|   | 6 | 89.6 | 1.08 |
|   | 8 | 87.5 | 1.05 |
|   | 10 | 85.8 | 1.03 |
|   | 12 | 84.2 | 1.01 |
|   | 14 | 82.9 | 1.00 |
|   | 16 | 81.7 | 0.98 |
|   | 18 | 80.8 | 0.97 |
| F | 1 | 29.2 | 0.70 |
|   | 2 | 25.8 | 0.62 |
|   | 3 | 24.6 | 0.59 |
|   | 4 | 24.2 | 0.58 |

Test results in Table I show that catalysts A-E were quite active for catalyzing the oxidation of CO with $O_2$ at a low temperature. Particularly active were Catalyst E (Pt/Fe oxide/$V_2O_5$/$Al_2O_3$) and Catalyst A (Pt/Fe oxide/$V_2O_5$), both prepared by impregnation of a $V_2O_5$ containing support with a solution of Pt and Fe compounds in concentrated nitric acid. $V_2O_5$-supported Catalysts A-E were more active than the $Ta_2O_5$-supported Control Catalyst F.

Reasonable variations, modifications and adaptations for various conditions and uses can be made within the scope of the disclosure and appended claims.

That which is claimed is:

1. A composition of matter comprising:
   (a) at least one vanadium oxide as support material,
   (b) platinum metal, and
   (c) an iron component selected from the groups consisting of iron metal, iron oxides and mixtures thereof.

2. A composition of matter in accordance with claim 1, wherein component (a) is $V_2O_5$.

3. A composition of matter in accordance with claim 1 comprising about 0.2 to about 10 weight-% Pt and about 0.1 to about 20 weight-% Fe.

4. A composition in accordance with claim 1, wherein said support material additionally comprises alumina.

5. A composition of matter in accordance with claim 1, wherein component (c) consists essentially of iron oxide.

6. A composition of matter in accordance with claim 1 having been prepared by a preparation process comprising the steps of impregnating said support material (a) with compounds of platinum and iron dissolved in an aqueous acid solution.

7. A composition of matter in accordance with claim 6, wherein said preparation process additionally comprises the steps of substantially drying the support material which has been impregnated with compounds of Pt and Fe, heating the substantially dried, and impregnated support material under such conditions as to substantially convert said compounds of Pt and Fe to oxides of Pt and Fe, and subjecting the obtained calcined material which contains oxides of Pt and Fe to a reducing treatment under such conditions as to substantially convert said oxides of Pt to Pt metal.

8. A process for preparing a composition of matter comprising:
   (a) at least one vanadium oxide as support material,
   (b) platinum metal, and
   (c) an iron component selected from the group consisting of iron metal, iron oxides and mixtures thereof;
   said process comprising the steps of:

(i) impregnating said support material with compounds of Pt and Fe dissolved in an aqueous acid solution;
(ii) substantially drying the material obtained in step (i);
(iii) heating the substantially dried material obtained in step (ii) under such conditions as to substantially convert said compounds of Pt and Fe to oxides of Pt and Fe; and
(iv) subjecting the calcined material obtained in step (iii) to a reducing treatment under such conditions as to substantially reduce said oxides of Pt to Pt metal.

9. A process in accordance with claim 8, wherein said support material is $V_2O_5$.

10. A process in accordance with claim 8, wherein said aqueous acid solution used in step (i) comprises about 20-65 weight-% $HNO_3$.

11. A process in accordance with claim 8, wherein step (iii) is carried out at a temperature in the range of from about 300° to about 700° F.

12. A process in accordance with claim 8, wherein step (iv) is carried out with hydrogen gas.

13. A process in accordance with claim 8, where step (iv) is carried out at a temperature in the range of from about 20° to about 600° C.

14. A process in accordance with claim 13, wherein said temperature in step (iv) is about 150°-350° C.

* * * * *